Patented July 8, 1952

2,602,789

UNITED STATES PATENT OFFICE 2,602,789

ETHER-ESTERS OF POLYHYDROXY COMPOUNDS

Joseph H. Schwartz, Philadelphia, Eugene A. Talley, Lafayette Hill, Morris Zief, Philadelphia, and Charles H. Fisher, Abington, Pa., assignors to the United States of America as represented by the Secretary of Agriculture No Drawing. Application August 23, 1949, Serial No. 111,962

15 Claims. (Cl. 260—234)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to ether-esters of aliphatic polyhydroxy compounds, particularly to ether-esters containing unsaturated ether groups and saturated ester groups, and has among its objects the provision of such new compositions and methods for their preparation. Other objects and advantages will be apparent from the description of the invention.

We have found that unsaturated ethers of aliphatic polyhydroxy compounds which contain unsubstituted hydroxyl groups can be esterified by reacting them with a saturated acylating agent, and that the resulting ether-esters possess properties which render them useful in the manufacture of coating compositions, plastics, adhesives and similar products.

According to the method of this invention, the ether-esters are produced by reacting an unsaturated ether of an aliphatic polyhydroxy compound containing at least one free hydroxyl group in the polyhydric alcohol radical, with a saturated acylating agent, preferably a carboxylic acylating agent, at reaction temperature, and in the presence of pyridine.

The resulting ether-ester formed by interaction of the acylating agent with the free hydroxyl group, or groups, of the polyhydric alcohol radical, can be recovered from the reaction mixture by any suitable means, as for instance by solvent extraction and distillation.

In general, our process is applicable to unsaturated ethers of aliphatic polyhydroxy compounds containing at least one unsubstituted hydroxyl group in the polyhydric alcohol radical. Suitable ethers of polyhydroxy compounds include, for example, the partially etherified unsaturated ethers of polyhydric aliphatic alcohols, such as glycols, like ethylene glycol, 1,3-butylene glycol, and dipropylene glycol; glycerol; pentaerythritol; pentitols; glucose and methyl glucoside; hexitols, like mannitol, sorbitol and inositol; dipentaerythritol; disaccharides, such as sucrose, and other carbohydrates like starch and cellulose, wherein at least one hydroxyl group is substituted by an unsaturated ether group containing the radical of an aliphatic monoolefinic alcohol, preferably an olefinic alcohol containing from 3 to 4 carbon atoms such as allyl, methallyl or crotyl alcohols or their halogen substitution products, like chloroallyl alcohols.

Especially valuable products are obtained by applying the method of this invention to allyl ethers of sucrose containing 2 to 7 allyl groups and allyl ethers of mannitol containing 2 to 5 allyl groups, and to the solvent-soluble allyl ethers of carbohydrates described in U. S. Patent 2,406,369.

Allyl ethers of starch containing at least 1.3, and preferably about 1.8–1.9, allyl groups per glucose unit, are best adapted for use in our process because of the superior products thereby obtained. The resulting ether-esters which contain the unsaturated ether group originally present in the starting material and having part, or substantially all, of the remaining hydroxyl groups esterified with saturated aliphatic or aromatic carboxylic acyl groups, display improved solubility in organic solvents and retain the desirable polymerization characteristics of the unsaturated ether used as the starting material. The products formed in oxidative polymerization, or insolubilization, of these ether-esters, by known methods, are in general more resistant to the action of water and similar reagents, than those derived from the original unsaturated ether, and this property is especially preeminent in those ether-esters which are substantially free of unsubstituted hydroxyl groups.

The saturated acylating agents adapted for use in the method of our invention are the anhydrides and acyl halides of saturated aliphatic and aromatic carboxylic acids and aromatic isocyanates. Suitable acylating agents include for example, anhydrides of lower fatty acids like acetic and propionic anhydride; chlorides of aliphatic, naphthenic, and aromatic acids such as acetic, propionic, butyric, isovaleric, 2-ethylhexanoic, 2-ethyl butyric, cyclohexanecarboxylic, hydrogenated abietic, adipic, sebacic, carbonic, lauric or stearic acid chloride; alkyl chloroformic acid like butyl chloroformate; chloride of aromatic carboxylic acids, like benzoyl chloride, o-chlorobenzoyl chloride and p-chlorobenzoyl chloride, phthalyl chloride, and phthalic anhydride; and isocyanates like phenyl isocyanate and octadecyl isocyanate, hexamethylene di-isocyanate, and other polyisocyanates including that made from phenylene diamine. Ketene and ketene derivatives also may be used as acylating agents.

The following examples are given as illustrative embodiments of a manner in which the process of our invention may be carried out in practice:

Example I

To 99 g. of allyl starch (containing 1.9 allyl groups per glucose unit) dissolved in 111 g. pyridine and 11 g. benzene was added 95 g. of acetic anhydride, and the mixture was heated at 80° C. for 4 hours. The acetyl ester of starch allyl ether was precipitated by pouring the reaction mixture, with stirring, into cold water. The precipitate was dissolved in acetone and precipitated from the solution by addition of hot water. The ether-ester of starch thus obtained contains 1.9 allyl and 1.1 acetyl groups per glucose unit.

Example II

To 302 g. of allyl starch (containing 1.8 allyl groups per glucose unit) dissolved in 295 g. pyridine and 72 g. benzene, was added 379 g. of propionic anhydride and the mixture was heated, with stirring, at 95° C. for 10 hours. The propionyl ester of starch allyl ether was then precipitated by adding water to the reaction mixture, and the precipitate was washed first with a dilute aqueous solution of sodium bicarbonate and then with water. The ether-ester of starch thus obtained contains 1.8 allyl and 1.2 propionyl groups per glucose unit.

Example III

To 200 g. of allyl starch (containing 1.7 allyl groups per glucose unit) dissolved in 146 g. pyridine and 44 g. benzene, was added 260 g. of benzoyl chloride, and the mixture was heated with stirring at 85° C. for 14 hours. It was then steam distilled, and the benzoyl ester of starch allyl ether was dissolved in toluene and the solution washed with dilute ammonium hydroxide. The ether-ester of starch thus obtained contains 1.7 allyl and 1.2 benzoyl groups per glucose unit.

Example IV

To 141 g. of allyl starch (containing 1.9 allyl groups per glucose unit) dissolved in 505 g. pyridine was added 78 g. of phenyl isocyanate, and the mixture was heated, with stirring, at 80° C. for 14 hours. The excess of isocyanate was eliminated by adding 20 ml. of absolute ethyl alcohol and heating the reaction mixture at 65° C. for 30 minutes. The allyl starch phenyl carbonate was precipitated by pouring the mixture into a large volume of 37% aqueous ethyl alcohol, and the precipitate was filtered off and steam distilled. The ether-ester of starch thus obtained contains 1.9 allyl and 0.9 phenyl carbamyl groups per glucose unit.

Example V

Following the procedure described in Example IV, allyl starch phenyl carbamate containing 1.9 allyl and 0.9 phenyl carbamyl groups per glucose unit was obtained by reacting 77 g. phenyl isocyanate with 140 g. allyl starch dissolved in 56 g. pyridine and 512 g. toluene.

Example VI

To 61 g. of allyl sucrose (containing 6.7 allyl groups) dissolved in 100 cc. of pyridine, 20 g. of acetic anhydride was added dropwise, with stirring at 60°–70° C. The mixture was then heated at 70° C. for 3 hours, allowed to stand overnight at room temperature, and was then poured with stirring into ice water. The supernatant liquid was discarded and the residue dissolved in chloroform. The solution was washed several times with water, decolorized with charcoal, dried over anhydrous sodium sulfate, and the solvent evaporated in vacuo under nitrogen. The allyl sucrose acetate thus obtained was a light brown oil; $n_D^{20} = 1.4782$.

Example VII

Allyl sucrose propionate was prepared as described in the foregoing example, using an equivalent amount of propionic anhydride in place of the acetic anhydride; light brown oil;

$$n_D^{20} = 1.4763.$$

Example VIII

To 62 g. of allyl sucrose (containing 6.7 allyl groups) dissolved in 160 cc. of pyridine at 60° C. was added 50 g. of benzoyl chloride, dropwise with stirring. The mixture was then heated at 70° C. for 2 hours and allyl sucrose benzoate was isolated as described in Example VI and obtained as a light brown oil; $n_D^{20} = 1.5171$.

Example IX

To 61 g. of allyl sucrose (containing 6.7 allyl groups) dissolved in 200 cc. of pyridine, was added, at room temperature, dropwise, and with stirring, a solution of 42 g. lauroyl chloride in 60 cc. of chloroform. The mixture was then heated at 90° C. for 5 hours, and allowed to stand overnight at room temperature. Ether was then added to precipitate the lauroyl chloride-pyridine complex which was removed by filtration, and the ethereal solution was washed with dilute sulfuric acid, then with sodium bicarbonate solution, and finally with water. The solution was then treated with decolorizing carbon, dried over anhydrous sodium sulfate and the solvent evaporated in vacuo under nitrogen. The residue consisting essentially of allyl sucrose laurate was a brown oil; $n_D^{20} = 1.4700$.

Example X

To 38 g. of allyl mannitol (containing 4.2 allyl groups) dissolved in 100 cc. of pyridine at 62°–65° C. was added slowly 40 g. of acetic anhydride. The mixture was then heated with stirring, at 70° C. for 3 hours, allowed to stand overnight at room temperature and then poured, with stirring, into ice water. The organic layer was taken up in chloroform; the chloroform solution washed several times with water, dried over anhydrous sodium sulfate and the solvent evaporated in vacuo under nitrogen. Allyl mannitol acetate thus obtained was a colorless oil; $n_D^{20} = 1.4671$.

Example XI

Following the procedure of Example X, and using 76.8 g. of allyl mannitol and 91 g. benzoyl chloride, allyl mannitol benzoate was obtained as a brown oil; $n_D^{20} = 1.5233$.

The hydroxyl content and gelation time of the allyl sucrose and allyl mannitol used as the starting materials and of some of the mixed ether-esters described in the foregoing examples, are shown in the following table.

The gelation time was determined at 100° C. with a rate of flow of 7.5 liters of O₂ per hour, essentially as described by Nichols et al., J. Am. Chem. Soc. 68 2020.

| | OH Groups | Gelation Time, (min.) |
|---|---|---|
| Allyl sucrose | 1.3 | 210 |
| Allyl sucrose acetate of Example VI | 0.0 | 226 |
| Allyl sucrose propionate of Example VII | 0.1 | 258 |
| Allyl sucrose benzoate of Example VIII | 0.0 | 229 |
| Allyl sucrose laurate of Example IX | 0.0 | 258 |
| Allyl mannitol | 1.8 | 305 |
| Allyl mannitol acetate of Example X | 0.0 | 301 |
| Allyl mannitol benzoate of Example XI | 0.0 | 354 |

We claim:

1. An ether-ester of an aliphatic polyhydroxy compound selected from the group consisting of starch containing at least 1.3 allyl groups per glucose unit, sucrose containing from 2 to 7 allyl ether groups per molecule, and mannitol containing from 2 to 5 allyl ether groups per molecule, and having substantially all of the other hydroxyl groups substituted by a saturated carboxylic ester group.

2. The ether-ester of claim 1 wherein the ester group is an aliphatic ester group.

3. The ether-ester of claim 1 wherein the ester group is an aromatic ester group.

4. An ether-ester of starch containing at least 1.3 allyl groups per glucose unit and having substantially all of the other hydroxyl groups substituted by a saturated carboxylic ester group.

5. The ether-ester of claim 4 wherein the ester group is an aliphatic ester group.

6. The ether-ester of claim 4 wherein the ester group is an aromatic ester group.

7. The ether-ester of claim 4 wherein the ester group is a benzoyl ester group.

8. An ether-ester of sucrose containing from 2 to 7 allyl ether groups and having substantially all of the other hydroxyl groups substituted by a saturated carboxylic ester group.

9. The ether-ester of claim 8 wherein the ester group is an aliphatic ester group.

10. The ether-ester of claim 8 wherein the ester group is an aromatic ester group.

11. The ether-ester of claim 8 wherein the ester group is a benzoyl group.

12. An ether-ester of mannitol containing from 2 to 5 allyl ether groups and having substantially all of the other hydroxyl groups substituted by a saturated carboxylic ester group.

13. The ether-ester of claim 12 wherein the ester group is an aliphatic ester group.

14. The ether-ester of claim 12 wherein the ester group is an aromatic ester group.

15. The ether-ester of claim 12 wherein the ester group is a benzoyl group.

JOSEPH H. SCHWARTZ.
EUGENE A. TALLEY.
MORRIS ZIEF.
CHARLES H. FISHER.

REFERENCES CITED

The following references are of record in the file of this patent:

UNITED STATES PATENTS

| Number | Name | Date |
|---|---|---|
| 1,876,920 | Hagedorn et al. | Sept. 13, 1932 |
| 2,047,952 | Ellsworth | July 21, 1936 |
| 2,073,052 | Dreyfus | Mar. 9, 1937 |
| 2,094,100 | Dreyfus | Sept. 28, 1937 |
| 2,146,755 | McNally et al. | Feb. 14, 1939 |
| 2,157,348 | Reppe et al. | May 9, 1939 |
| 2,372,337 | Pascu et al. | Mar. 27, 1945 |
| 2,406,369 | Hamilton et al. | Aug. 27, 1946 |
| 2,413,463 | Nicholas et al. | Dec. 31, 1946 |
| 2,492,203 | Treadway | Dec. 27, 1949 |

OTHER REFERENCES

Talley et al. JACS v. 67 (1945) p. 2037–2039, 3 pages.